United States Patent [19]
Mouri

[11] Patent Number: 5,259,257
[45] Date of Patent: Nov. 9, 1993

[54] POWER SLIDER

[75] Inventor: Takayuki Mouri, Kanagawa, Japan

[73] Assignee: Ikeda Bussan Co., Ltd., Ayase, Japan

[21] Appl. No.: 968,502

[22] Filed: Oct. 29, 1992

[30] Foreign Application Priority Data

Oct. 31, 1991 [JP] Japan .................. 3-089705[U]

[51] Int. Cl.$^5$ .............................. B60N 1/08
[52] U.S. Cl. .................... 74/89.15; 74/425; 297/344.1; 248/429
[58] Field of Search ........... 74/89.15, 425; 297/346; 248/429

[56] References Cited

U.S. PATENT DOCUMENTS 4,802,374  2/1989  Hamelin et al. ............ 74/89.15 X
5,150,872  9/1992  Isomura ..................... 74/89.15 X

FOREIGN PATENT DOCUMENTS 0404665  12/1990  European Pat. Off. ........ 74/89.15
62-26140  2/1987  Japan ........................ 248/429
2160949   1/1986  United Kingdom ......... 74/89.15

Primary Examiner—Allan D. Herrmann
Assistant Examiner—William O. Trousdell
Attorney, Agent, or Firm—Foley & Lardner

[57] ABSTRACT

A power seat slider comprises a gearbox with connecting mounting brackets integrally connected therewith. A mounting surface portion of the gearbox faces an inner wall of a seat slide rail and is provided with a positioning projection. Upper portions of each of the connecting mounting brackets are also provided with positioning projections to assure proper engagement between drive portions of the seat slider mechanism.

11 Claims, 5 Drawing Sheets

POWER SLIDER

BACKGROUND OF THE INVENTION

1. Field of The Invention

The present invention relates generally to a power slider. Particularly, the present invention relates to a power seat slide device for automotive vehicle seats.

2. Description of The Prior Art

Conventionally, power seat sliders are known in the which comprise a rail arrangement wherein one rail is mounted on a vehicle body and a second rail is engaged with the mounted rail to as to be relatively movable thereto, a seat being mounted on the movable rail. An electric motor is connected so as to drive the movable rail for moving the seat in forward and rearward directions.

Such a conventional power seat slider is shown in FIG. 6. According to this arrangement, a gear box 2 transmits torque from -an electric motor 5 to a screw member 6. The gear box is attached via brackets 3, 3 to an upper inside surface 1a of an upper, slidable rail 1 by a pair of bolts 4. The motor 5 is attached, by screws, bolts, or the like, to an outer wall 1b of the slidable rail 1 such that an output shaft 5a of the motor 5 engages and input shaft 2a of the gearbox 2 for allowing rotation to be transmuted therebetween.

However, according to the above described construction, it is necessary to assure correct alignment between the output shaft 5a of the motor 5 and the input shaft 2a of the gearbox 2, but, since the only means for positioning the gearbox is via the brackets 3 and the bolts 4, if machining errors or the like cause positioning inaccuracies to occur in production correct alignment between these components cannot be reliably assured. Thus, the input shaft 2a and the output shaft 5a may become eccentric relative to each other and excessive load is thereby applied to the motor 5 and operability and durability of the drive assembly is considerably degraded and further, unacceptably noisy operation of the slider may result.

Moreover, during the assembly process, in which the gearbox 2 is positioned between the brackets 3, 3, to be fastened to the slidable rail surface 1a via the bolts 4, positional displacement of the gearbox may easily occur and assembly thus becomes troublesome and time consuming and costs and complexity are increased.

SUMMARY OF THE INVENTION

It is therefore a principal object of the present invention to overcome the drawbacks of the prior art.

It is a further objection of the present invention to provide a power seat slider in which positioning accuracy of drive components may be assured and an assembly process-therefor may be simplified.

It is also an object of the present invention to provide a power seat slider in which a motor is protected from excessive load and which may enjoy enhanced operability and durability.

In order to accomplish the aforementioned and other objects, a power slider is provided, comprising: a rail assembly including a first fixed rail fixedly mounted on a mounting surface and, a second slidable rail which interlocks with the first fixed rail so as to be relatively movable thereto in forward and rearward directions corresponding to a longitudinal direction of the rail assembly; an electric motor attached to an outer surface of the second slidable rail such that an output shaft of the motor extends into an interior space defined between the first fixed and second slidable rails; driving means for transmitting torque from the motor for moving the second slidable rail relative the first fixed rail, the driving means including; a elongate screw member, rotatably mounted on the second slidable rail in the interior space; a gearbox fixed via an integral mounting bracket to a surface of the slidable rail, the gearbox engaging one end of the elongate screw member and containing a gear group for transmitting torque of the motor to the elongate screw member, the gearbox including a positioning projection corresponding to a positioning opening on the surface of the slidable rail and insuring positioning of an input shaft of the gearbox relative to the output shaft of the motor when fixed to the surface of the slidable rail; a threaded member fixedly anchored to the first fixed rail and having the elongate screw member threaded therethrough and allowing rotation of the elongate screw member according to driving torque applied via the motor.

DESCRIPTION OF THE PREFERRED EMBODIMENT

FIGS. 1-5 show a preferred embodiment of a power seat slider according to the invention.

Figure 1:
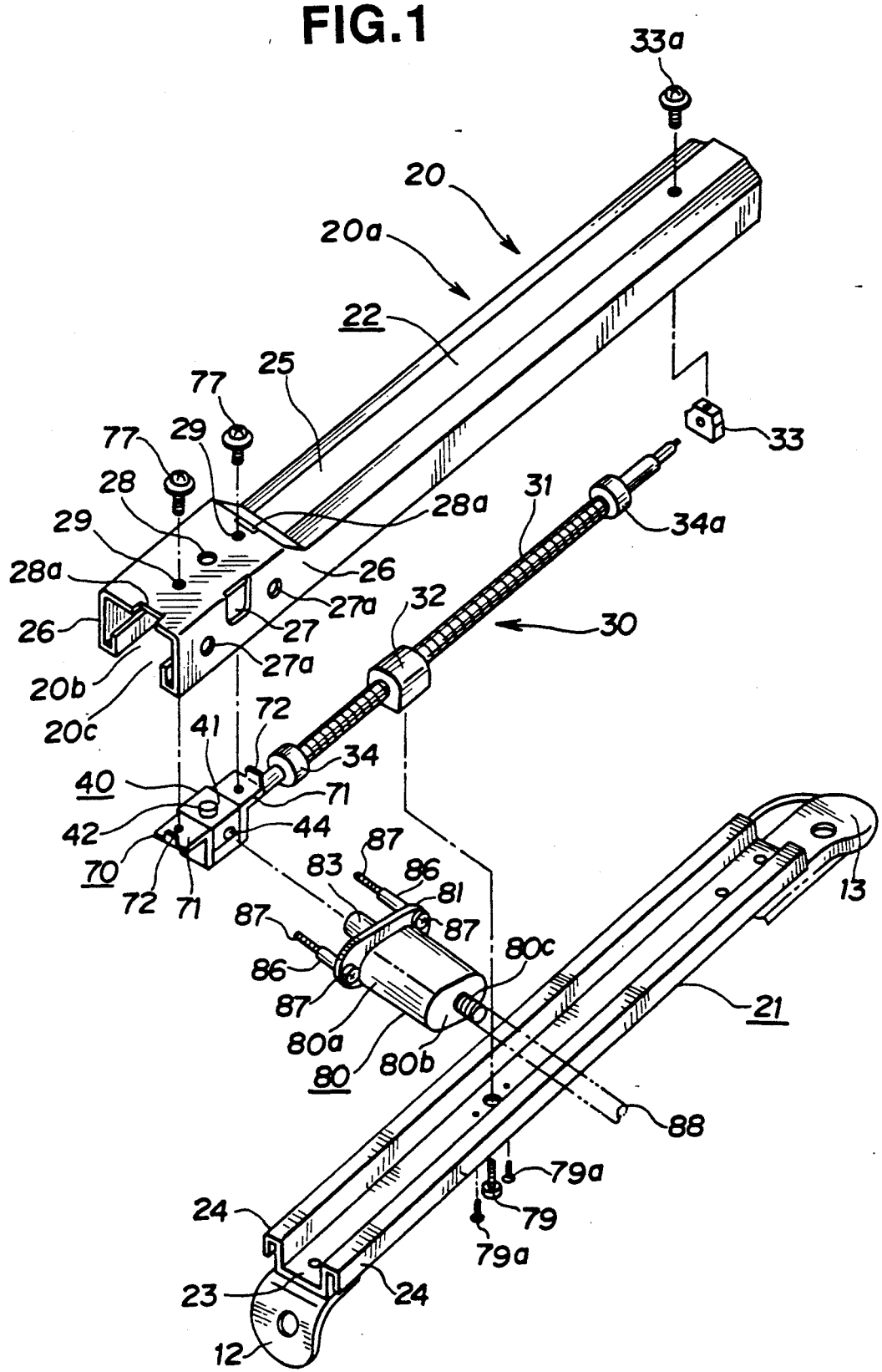
FIG. 1 is an exploded perspective view of the entire power seat slider of according to a first embodiment of the invention.

Referring now to the drawings, particularly to FIG. 1, a power seat slider 20 includes a rail unit 20a comprising a lower fixed rail 21 attached to a floor of an automotive vehicle, for example, via leg members 12 and 13 and a upper, slidable rail 22 which interlockingly engages the fixed rail 21 and is slidably movable relative thereto. A seat 10a (see FIG. 5) is mounted on the slidable rail 22.

Figure 2:
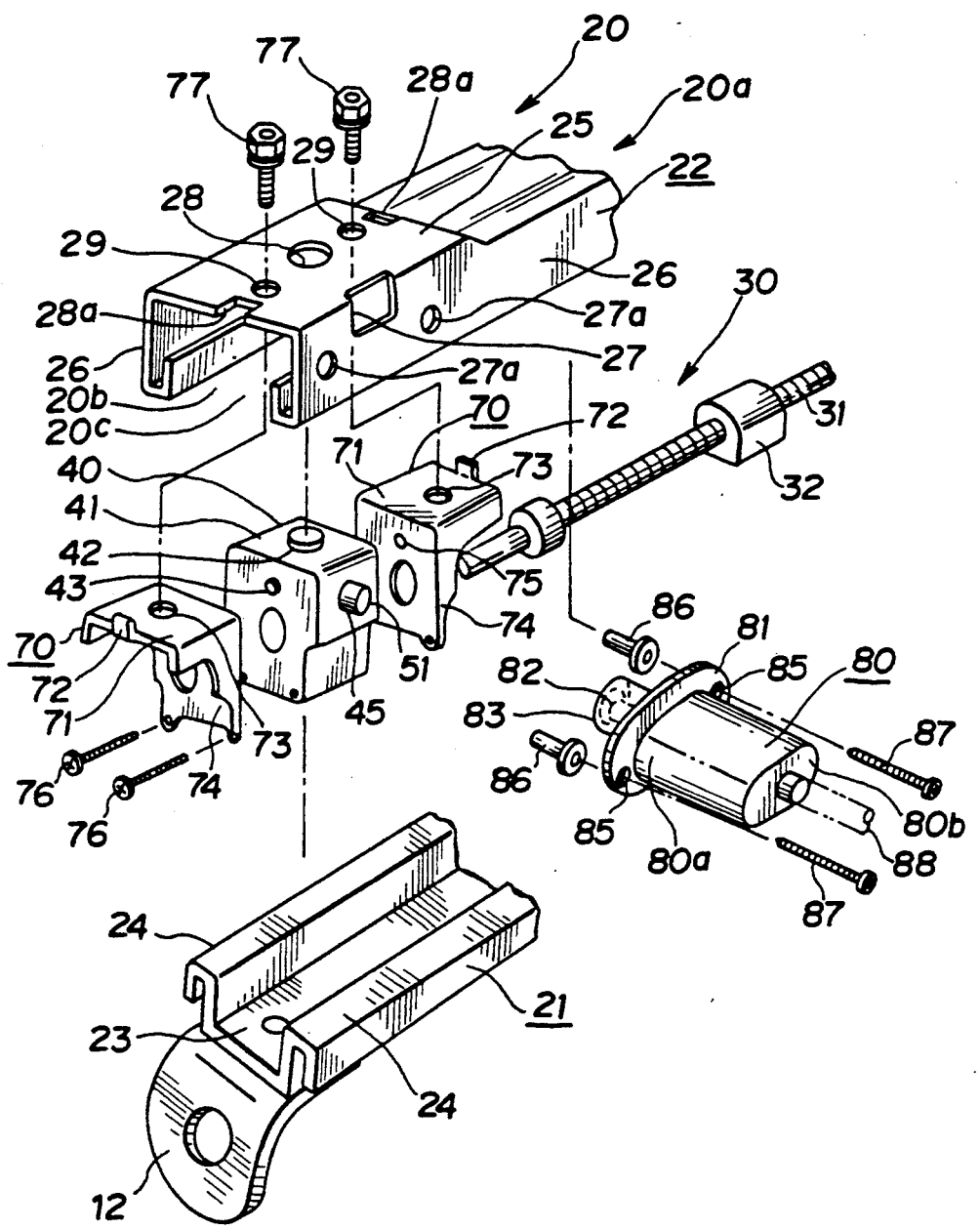
FIG. 2 is an exploded perspective view of an essential portion of a power seat slider according to a first embodiment of the invention.

As may be seen in FIGS. 1 and 2, the fixed rail 21 has a generally U-shaped configuration including a bottom surface portion 23 and side wall portions 24, 24. The slidable rail 22 is generally of an inverted U-shaped configuration and includes an upper surface portion 25 and downwardly extending side wall portions 26, 26.

One of the wall portions 26 of slidable rail 22 is provided with a guide bore 27 and positioning openings 27a, 27a proximate the guide bore 27. An electric motor 80 is mounted to said one of the wall portions 26 via a flange member 81 formed at a forward portion of a casing 80a of the motor 80. The flange member has openings 85, 85 corresponding to the positioning openings 27a, 27a, for attaching the motor 80 to the side wall 26 via bolts 87 and welded nuts 86, or the like, such that an output shaft 82 of the motor 80 extends through the guide bore 27 into the interior of the slidable rail 22.

Figure 4:
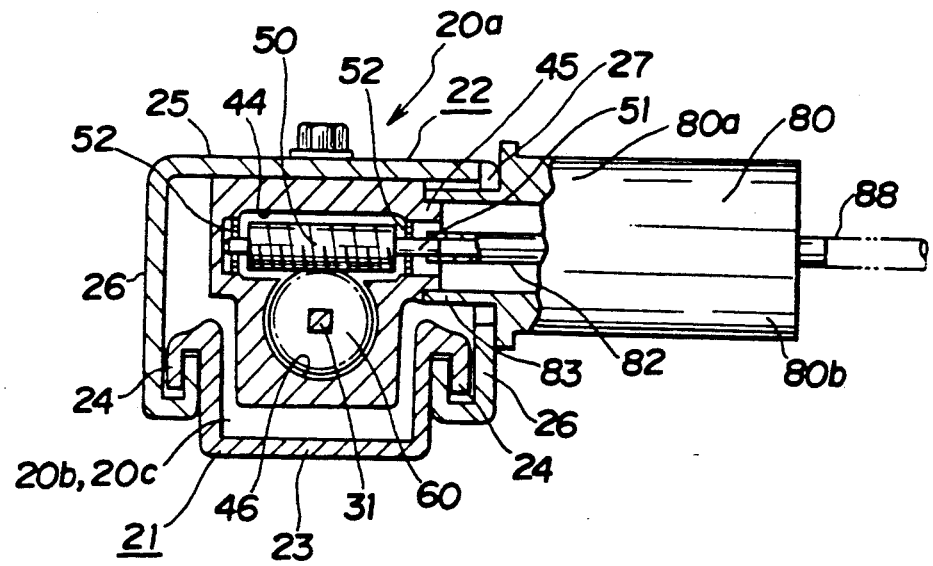
FIG. 4 is a lateral cross-sectional view of the assembled essential portion of the invention shown in FIG. 2.

Viewed laterally, as seen in FIG. 4, the engaged upper and fixed rails 21, 22 define an enclosed space 20b therebetween, defined by the bottom surface portion 23 of the fixed rail, the side wall portions 24 thereof, the upper surface portion 25 of the slidable rail 22 and the side wall portions 26, 26 thereof. A forward end portion of the upper surface portion 25 of the slidable rail 22 is raised to form a mounting space 20c for a gearbox 40.

Within the enclosed space 20b, a drive portion 30 is installed. The drive portion 30 comprises a screw member 31 which extends in the longitudinal direction of the space 20b, a nut 32 which is rotatably engaged with the screw member 31 and the gear box 40 which is mounted in the mounting space 20c for transmitting torque to the screw member 31 from the motor 80 at a reduced rotation speed.

The gear box 40 has a pair of brackets 70, 70 attached to each side thereof which is perpendicular to the longitudinal direction of the rail unit 20a. The gear box is then attached to the upper surface portion 25 of the slidable rail, via the brackets 70, 70 by bolts 77, 77.

Figure 3:
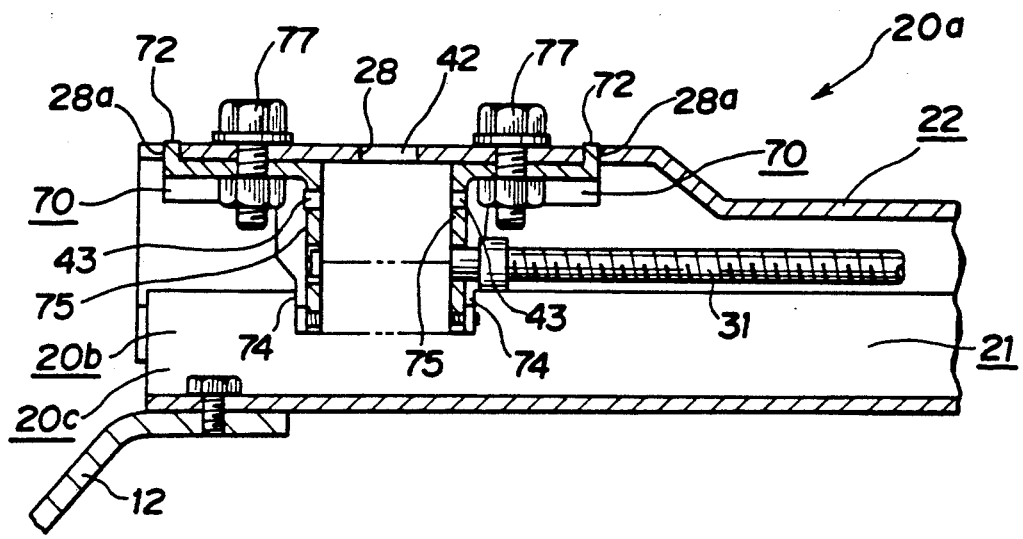
FIG. 3 is a longitudinal cross-sectional view of the assembled essential portion of the invention shown in FIG. 2.

As shown in FIGS. 1 and 3. the sides of the gearbox 40 which receive one of the brackets 70 is provided with a positioning projection 43 for engaging a corresponding positioning opening 75 formed in a mounting face 74 of each of the brackets 70 for assuring accurate positioning when attaching the gearbox 40 to the brackets 70. When correct positioning is established, each of the brackets 70 is attached to the gearbox via a pair of screws 76, 76. Thus, the gearbox 40 and the mounting brackets 70, 70 are integrally connected for installation substantially as a single unit.

Further, at an upper mounting surface 41 of the gearbox 40, an upper positioning projection 41 is provided. The upper surface portion 25 of the slidable rail 22 has a corresponding positioning opening 28 for receiving the upper positioning projection 41. The upper positioning projection 41 and the positioning opening 28 cooperate with engaging grooves 28a, 28a formed in the upper surface portion 25 of the slidable rail and corresponding engaging tabs 72, 72 formed so as to project upwardly from an upper surface 71 of each mounting bracket 70. The engaging grooves 28a, 28a are longitudinally offset from the positioning opening 28 on each side thereof for assuring correct alignment of the gearbox when installed on the upper surface portion 25 of the slidable rail 22. Further, at each side of the positioning opening 28, bolt holes 29, 29 are formed, the bolt holes 29, 29 corresponding to second bolt holes 73, 73 formed in the upper surface 71 of each of the brackets 70.

Thus, the gearbox may be secured to the upper surface portion 25 of the slidable rail 22 via the brackets 70 by bolts 77, 77 while correct alignment of an input shaft 51 of the gearbox 40 relative the output shaft 82 of the motor 80 is assured by engagement of the upper positioning projection 41 and the positioning opening 28 and the engaging grooves 28a, 28a and the engaging tabs 72, 72.

Referring again to FIG. 4, the interior of the gearbox 40 may be seen. As shown in the drawing, the gearbox 40 contains a worm gear 50 rotatably disposed in a receiving space 44 and a worm wheel 60 operatively engaged with the worm gear 50 and rotatably mounted in a second receiving space 46. At each end of the receiving space 44, shaft bearing members 52, 52 are disposed. The shaft bearing members 52, 52 rotatably support the input shaft 51 of the gearbox 40 on which the worm gear 50 is mounted for being rotated according to rotation of the output shaft 83 of the motor 80. Projecting from the face of the gearbox 40, substantially coaxially with the input shaft 51 thereof, a cylindrical coupling portion 45 is provided so as to surround the portion of the input shaft 51 projecting from the gearbox 40. As may be seen in FIG. 4, the cylindrical coupling portion is inserted into a corresponding cylindrical mounting portion 83 projected from the flange portion 81 of the motor 80 so as to substantially surround the output shaft 82 of the motor 80.

Thus when the above-described components are installed as set forth above, the cylindrical mounting portion 83 of the motor 80 is passed through the guide bore 27 of the slidable rail 22 and receiving on the cylindrical coupling portion 45 of the gearbox 40. The output shaft 82 of the motor 80 has an annular cross section and a leading end thereof is received on a leading end of the input shaft 51 of the gearbox 40 mounting the worm gear 50, to allow co-rotation of the output shaft 82 and the input shaft 51.

The gearbox is operatively associated with the drive portion 30 in the following manner.

As seen in FIG. 1, the nut 32 is fixedly anchored to the bottom portion 23 of the fixed rail 21 by a screw 79 and alignment screws 79a, 79a. The screw member 31 on the other hand is rotatably mounted on the slidable rail 22 in the enclosed space 20b. one end of the screw member 31, outward of a front stopper member 34, is received into the gearbox 40 and attached to the worm wheel 60 for co-rotation therewith, the other end of the screw member 31, outward of a rear stopper member 34a is rotatably received in a rear mount 33 fixed to the upper surface portion 25 of the slidable rail 22 by a screw 33a, or the like.

The stopper members 34 and 34a contact opposite sides of the nut 32 at opposite extremes of the movement of the slidable rail 22 for limiting a movable range thereof.

Assembly and operation of the power seat slider according to the above described embodiment will be explained hereinbelow with reference to the drawings.

For assembling the power seat slider of the invention, first the motor 80, which supplies driving power for the slider mechanism is attached to the side of the slidable rail 22 by the bolts 87 and welded nuts 86. Then, as seen in FIG. 1, the gearbox 40 is connected to the pair of brackets 70 by the bolts 76 while engagement of the positioning projections 43 of the gearbox 40 and the positioning openings 75 of the brackets is maintained and then the integrally connected assembly of gearbox 40 and bracket& 70 is attached to the upper surface portion 25 of the slidable rail 22 at the enlarged forward mounting space 20c via bolts 77, 77.

Specifically, when the gearbox 40 and the brackets are attached to the upper surface portion 25 of the slidable rail 22, the positioning projection 42 of the gearbox 40 is engaged with the engaging opening 28 of the upper surface portion 25 of the slidable rail 22 and the positioning tabs 72 of the brackets 70 are engaged with the engaging grooves 28a of the slidable rail 22 for assuring accurate positioning of the gearbox 40 relative to the output shaft 82 of the motor 80.

Accordingly, undesired play between the output shaft 82 of the motor 80 and the input shaft 51 of the gearbox 40 is prevented allowing more efficient and quiet operation of the power seat slider.

As described hereinabove, since the gearbox 40 can be easily connected to a predetermined position with no dislocation of parts occurring, assembly of the parts is substantially simplified.

As seen in FIG. 4, the torque of the output shaft 82 is directly transmitted to the worm gear 50 in the gearbox 40 and the torque drives the screw member 31 to rotate in a direction reverse to the output shaft 82 due to the engagement between the worm gear 50 and the worm wheel 60 which turns the screw member 31. Also, this gear engagement established a rotation speed of the screw member 31 which is lower than that of the output shaft 82.

Since the nut 32 is non-rotatably and unmovably fixed to the bottom portion 23 of the fixed rail 21, rotation of the screw member 31, according to clockwise or counterclockwise rotation of the output shaft 82 of the motor 80, induces forward or rearward movement of the screw member 31 relative to the nut 32 causing the slidable rail 22 to move forward or backward relative to the fixed rail 21, adjusting the position of the seat 10a attached to the slidable rail 22.

Although, in the above-described embodiment, the mounting although the gearbox 40 is provided with positioning projections 42, 43, 43, and the brackets 70, 70 and the upper surface portion 25 of the slidable rail 22 are provided with positioning openings 75, 75, 28, 28a, 28a, a reverse arrangement to the above is also possible. In addition, although according to the above embodiment, the gearbox 40 and the brackets 70, 70 are integrally attached, alternatively, the gearbox and the brackets may be integrally formed, that is, manufactured as a single piece.

Figure 5:
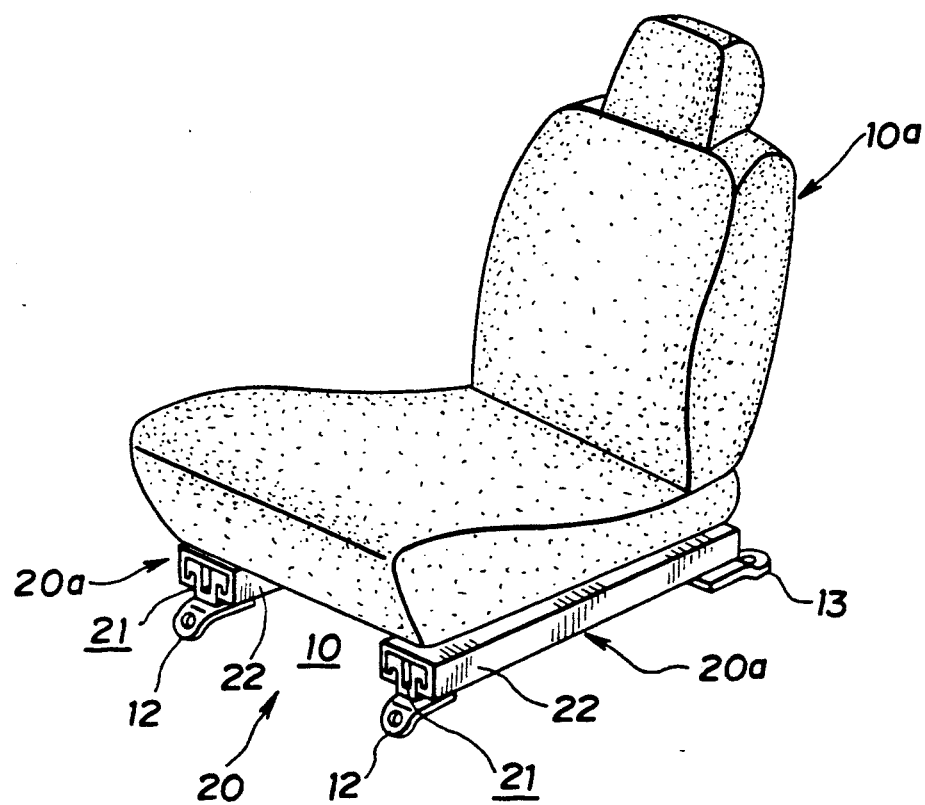
FIG. 5 is a perspective view of a seat equipped with the power seat slider of the invention.
Figure 6:
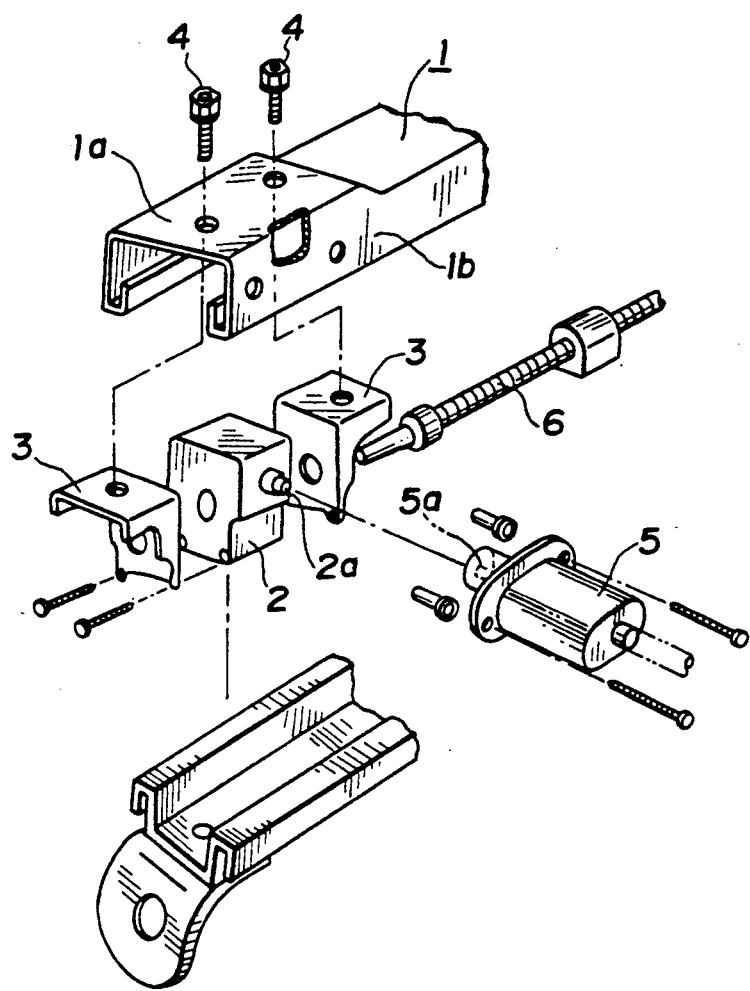
FIG. 6 is an exploded perspective view of a conventional power seat slider.

Also, although the present invention is described in terms of a single rail unit type power seat slider the present invention may also be implemented using a pair of rail units 20a mounted at left and right sides of a seat, for example. FIG. 5, shows a second embodiment of the present invention using a pair of rail units 20a at left and right sides of the seat 10a.

According to this embodiment, all components are arranged and constructed as described above with additional structure as described below. As seen in FIG. 2, an end portion of the motor 80 is provided with connecting means 80c is provided on an end 80b of the motor 80 opposite that from which the output shaft 82 is projected for connecting a flexible wire 88 thereto for transmitting torque from the output shaft 82 of the motor 80 to the second rail unit 20a.

According to this construction, the motor 80 is mounted on a rail assembly 20a on a side which faces the second rail assembly 20a supporting the opposite side of the seat 10a. The end of the flexible wire 88 opposite that attached to the motor 80 via the connecting means 80c is mounted on the slidable rail 22 of the opposite rail assembly 20a via a flange portion similar to the flange portion 81 mounting the motor 80 such that an end of the flexible wire 88 projects into a second gearbox 40 to act as a second output shaft 82 of the motor. Thus when the single motor is driven, both slidable rails 22, 22 of both rail assemblies 20a, 20a are driven in identical fashion.

Thus, according to the present invention, a power seat slider is provided in which assembly is simplified, reducing costs, while accuracy of positioning of the component parts thereof is assured. Further, the electric motor is protected from excessive load and operability and durability of the drive components is enhanced and quiet operating characteristics may be achieved.

It will be noted that, although the preferred embodiment of the invention is described in terms of a power seat slider for automotive vehicles, the power slider of the invention may be used to control motion of any desired object which is to be displaced relative to a mounting surface.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A power slider comprising:
   a rail assembly including a first fixed rail fixedly mounted on a mounting surface and, a second slidable rail which interlocks with said first fixed rail so as to be relatively movable thereto in forward and rearward directions corresponding to a longitudinal direction of said rail assembly;
   an electric motor attached to an outer surface of said second slidable rail such that an output shaft of said motor extends into an interior space defined between said first fixed and second slidable rails; and
   driving means for transmitting torque from said motor for moving said second slidable rail relative said first fixed rail, said driving means including;
   a elongate screw member, rotatably mounted on said second slidable rail in said interior space;
   a gearbox fixed via an integral mounting bracket to a surface of said second slidable rail, said gearbox engaging one end of said elongate screw member and containing a gear group for transmitting torque of said motor to said elongate screw member, said gearbox including a positioning projection corresponding to a positioning opening on said surface of said second slidable rail and insuring positioning of an input shaft of said gearbox relative to said output shaft of said motor when fixed to said surface of said second slidable rail; and
   a threaded member fixedly anchored to said first fixed rail and having said elongate screw member threaded therethrough and allowing rotation of said elongate screw member according to driving torque applied via said motor.

2. A power slider as set forth in claim 1, wherein said mounting bracket is formed separately from said gearbox and said gearbox includes a second positioning projection corresponding to a second positioning opening on said mounting bracket and insuring a desired positioning between said gearbox and said mounting bracket when said mounting bracket is attached to said gearbox for mounting said gearbox on said surface of said second slidable rail.

3. A power slider as set forth in claim 1, wherein said gearbox transmits torque from said motor to said elongate screw member at a reduced speed of rotation.

4. A power slider as set forth in claim 1, wherein stopper members are provided at each end of said elongate screw member for limiting a degree of movement of said second slidable rail relative to said first fixed rail.

5. A power slider as set forth in claim 2, wherein said mounting bracket includes a third positioning projection and said surface of said second slidable rail includes a third positioning opening corresponding to said third positioning projection of said mounting bracket.

6. A power slider as set forth in claim 1, wherein said second slidable rail includes mounting means for mounting a seat thereon.

7. A power slider as set forth in claim 6, wherein said seat is a seat for an automotive vehicle and said mounting surface mounting said first fixed rail is a portion of a vehicle body and/or chassis.

8. A power slider as set forth in claim 6, wherein a pair of rail assemblies are utilized, being mounted on left and right sides of said seat respectively.

9. A power slider as set forth in claim 8, wherein said motor is provided on a side of a second slidable rail of one of said rail assemblies which faces the other of said pair of rail assemblies.

10. A power slider as set forth in claim 9, wherein said motor includes connection means at a side thereof opposite said output shaft, said connection means being connected to a flexible cable for transmitting torque of said motor to second driving means provided in said other of said pair of rail assemblies.

11. A power slider as set forth in claim 1, wherein said interior space is enlarged at one end of said rail assembly and accommodates said gearbox.

* * * * *